United States Patent [19]

Kaneko et al.

[11] Patent Number: 5,131,744
[45] Date of Patent: Jul. 21, 1992

[54] MIRROR ROTATION ANGLE DETECTION MECHANISM

[75] Inventors: Hisaharu Kaneko, Yokohama; Yuwa Ishii, Kawasaki, both of Japan

[73] Assignee: Nikon Corporation, Tokyo, Japan

[21] Appl. No.: 670,341

[22] Filed: Mar. 15, 1991

[30] Foreign Application Priority Data

Mar. 22, 1990 [JP] Japan .................................. 2-72684

[51] Int. Cl.$^5$ ............................................. G01B 11/26
[52] U.S. Cl. .................................... 356/138; 356/375; 250/234
[58] Field of Search ............... 356/138, 375, 373, 152; 250/234, 235, 236, 201.1

[56] References Cited

U.S. PATENT DOCUMENTS 4,694,164  9/1987  Noguchi .......................... 250/234

Primary Examiner—F. L. Evans
Attorney, Agent, or Firm—Shapiro and Shapiro

[57] ABSTRACT

A mirror rotation angle detection mechanism is provided for an optical system having a mirror which is rotatable about an axis substantially on a reflection surface thereof at which a main beam of light is reflected. The mirror has a thin reflective layer with opposite surfaces that are nearly coplanar, and one of which constitutes the main beam reflection surface. The detection mechanism includes a light emitting member to irradiate a beam of detection light onto the opposite surface of the reflective layer. A light receiving element recieves the reflected detection beam, and an angle detection circuit detects the rotation angle of the mirror in accordance with the output of the light receiving element. According to a preferred embodiment, a condenser lens may be arranged between the light emitting member and the detection beam reflection surface.

4 Claims, 6 Drawing Sheets

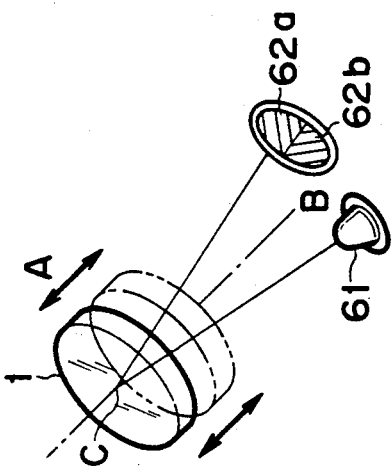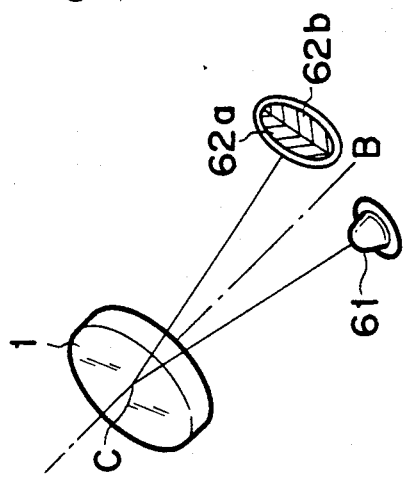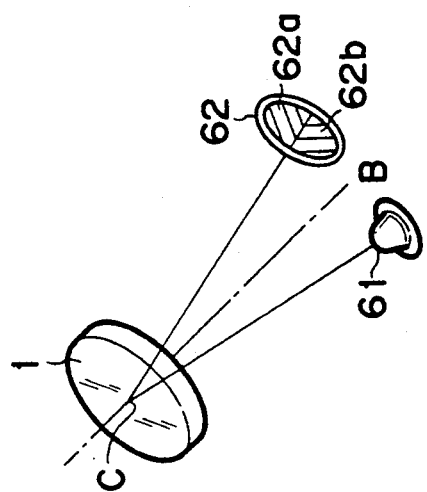

MIRROR ROTATION ANGLE DETECTION MECHANISM

BACKGROUND OF THE INVENTION

1. Field of the Invention

The present invention relates to a mirror rotation angle detection mechanism employed for the mirror rotation type tracking actuator and others of a high-speed access photoelectro-magnetic disc driving apparatus.

2. Related Background Art

In recent years, it has increasingly become necessary to detect precisely at a low cost the mirror rotation angle of a mirror rotation type tracking actuator in seek in order to speed up the access of a photoelectro-magnetic disc driving apparatus.

A conventional apparatus for this purpose is structured as shown in FIG. 1. In FIG. 1, the light ray 8 from an optical head is reflected by a mirror 1. The mirror 1, a mirror holder 2, and a coil 3 are rotatably held by a supporting member (not shown) to rotate in the plane of the drawing with the reflection point C of the light ray 8 on the surface of the mirror 1 as its substantial center. The coil 3 is wound around the mirror holder 2. A magnet 4 and a yoke 5 form a magnetic circuit. The mirror 1 is driven to rotate together with the mirror holder 2 and coil 3 when a current is applied to the coil 3. Photocoupler 63 and 64 are both reflective and output signals in accordance with the distance to a reflection surface 2a arranged on the mirror holder 2 by utilizing the property that the reflective luminous energy varies by distance. The reflective photocoupler 63 and the reflective photocoupler 64 are located relative to the mirror 1 at positions opposite to each other, and each of the output signal 63a and output signal 64a is inputted into a differential amplifier 7. The differential amplifier 7 picks up the differential between the output signal 63a and output signal 64a respectively of the reflective photocoupler 63 and photocoupler 64. The said differential is the difference between the two luminous energies, i.e., the difference in distances between the mirror surface 2a and the reflective coupler 63 and the reflective coupler 64, and is the rotation angle signal of the mirror which is in the plane of the drawing with the point C as its center.

The performance of the above-described conventional structure is limited by a number of factors. For example, the structure is subject to certain vibration modes, including, for instance, a vibration mode which causes the mirror holder 2 to have translational motion in the direction indicated by arrow A as shown in FIG. 1, and a rotational vibration mode with the center line B of the mirror 1 as its center. Also, the reflective photocoupler 63 and reflective photocoupler 64, which function as rotation angle sensors, do not detect the rotation angle of the mirror 1 directly. In practice, the reflective photocouplers detect the distance between the mirror holder 2 and the reflection surface 2a. This limits detection accuracy because, in manufacturing, the reflection surface 2a cannot be made exactly parallel with the reflection surface of mirror 1. Furthermore, differences in the sensitivities of the reflective photocouplers 63 and 64 limit detection accuracy.

As an example, if there occurs the vibration mode which results in the translational motion in the directions A and further, the translational motion is deviated, the waveforms of the output signals of the differential amplifier 7 are influenced, thus making it impossible to perform a highly precise detection of the rotation angles. Also, when the rotational vibration mode is generated which has the center line B as its center, the waveforms of output signals of the photocoupler 63, photocoupler 64, etc. are not equally affected if the manufacturing precision of the reflection surface 2a of the mirror holder 2 or the structural precision of the supporting member is not extremely high. Then, a highly precise detection of rotation angles cannot be performed.

SUMMARY OF THE INVENTION

In consideration of the foregoing the present invention has been designed, and an object thereof is to provide an improved high-precision mirror rotation angle detection mechanism.

To this end, the present invention provides a mirror rotation angle detection mechanism, which comprises a mirror to be rotated about an axis substantially on a front surface of a reflective layer, a light emitting element to irradiate a detection beam onto the reflective layer, a light receiving element to receive reflected detection beams, and an angle detection circuit for detecting the rotation angle of the mirror from the reflected detection beam.

In one preferred embodiment, a condenser lens 9 is arranged between the light emitting element and the mirror.

According to the present invention, the limitations of conventional systems, such as the influences of the earlier-mentioned translational motion vibration mode and rotational vibration mode, are avoided, thus making it possible to detect and follow the mirror rotation angle highly precisely.

BRIEF DESCRIPTION OF THE DRAWINGS

FIGS. 3A to 3C are views illustrating the operation of the mirror rotation angle detection mechanism shown in FIG. 2.

DETAILED DESCRIPTION OF THE PREFERRED EMBODIMENTS

Figure 1:
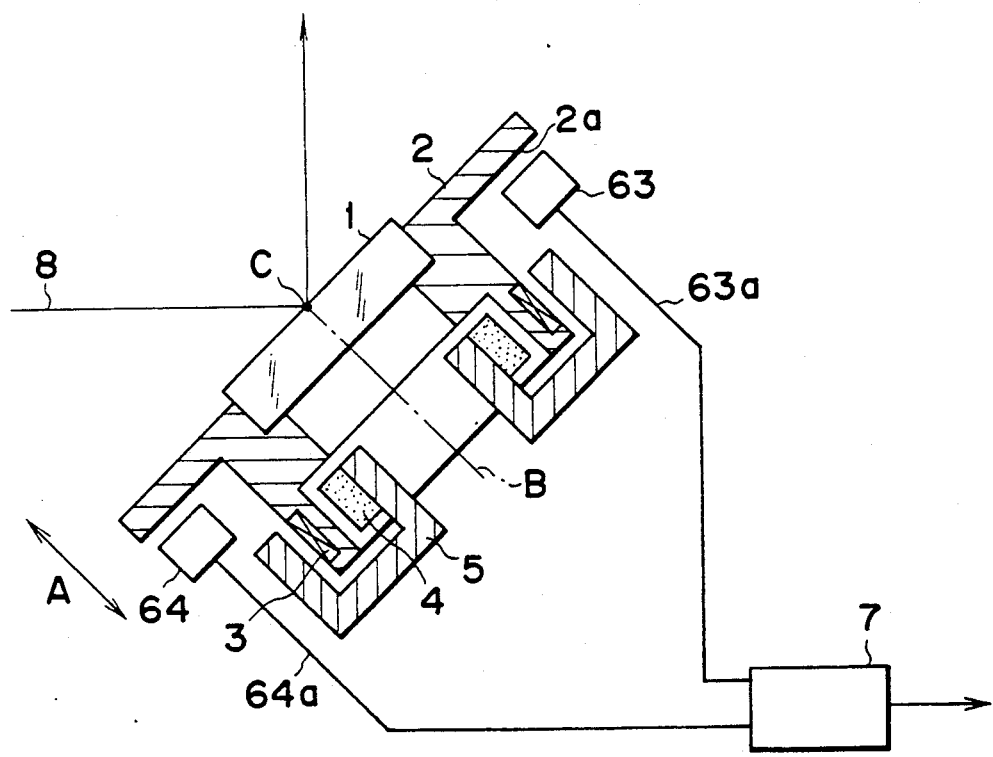
FIG. 1 is a cross-sectional view showing a conventional mirror rotation angle detection mechanism.
Figure 2:
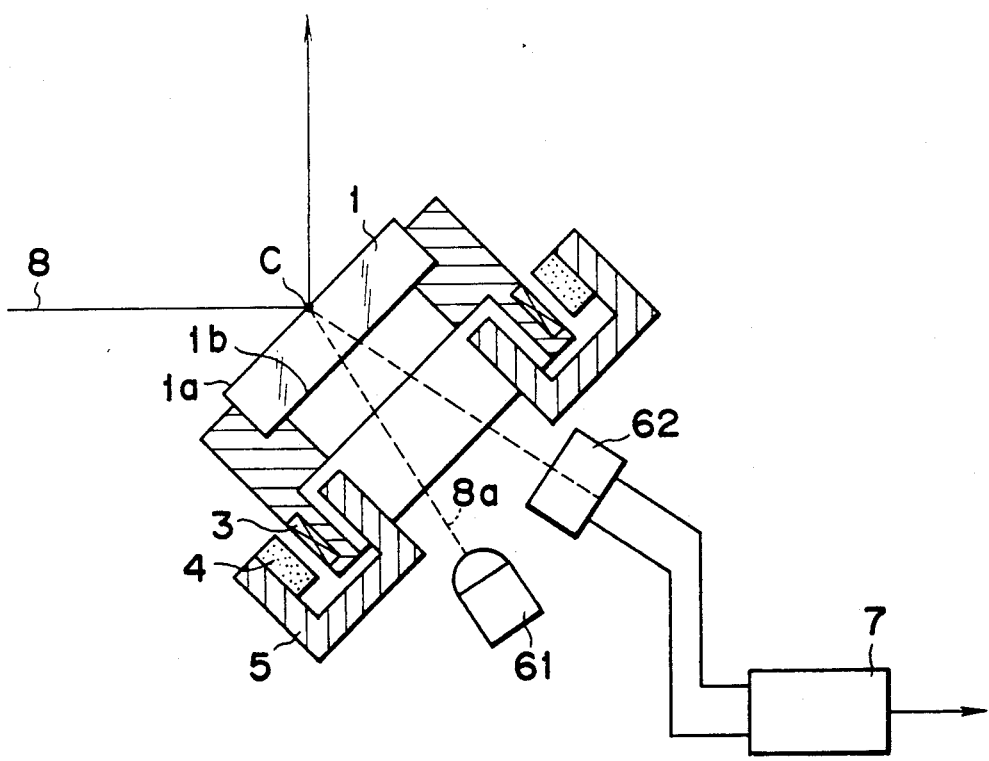
FIG. 2 is a cross-sectional view showing an embodiment of a mirror rotation angle detection mechanism according to the present invention.

FIG. 2 is a view showing an embodiment of the present invention, in which the same reference designations as those appearing in FIG. 1 represent the same constituents. In FIG. 2, a reference numeral 61 designates a light emitting element for emitting a controlling beam; 62, a light receiving element for receiving the said beam; 1a, the mean reflection or front surface the reflective layer of a mirror 1; and 1b, the surface of the reverse side of the reflective layer of the thick mirror 1.

The light receiving element 62 is a two-piece photodiode or a like element, and as shown in FIGS. 3A to 3C, the receiving part thereof is divided into two parts 62a and 62b, thereby enabling the difference in the luminous energies of these parts to be measured.

The light ray (main beam) 8 from an optical head is reflected by the mirror 1. The mirror 1 is rotatably supported by a supporting member (not shown) together with a mirror holder 2 and a coil 3 to be rotated about a point C as its center in the plane of the drawing. The coil 3 is arranged in a magnetic circuit comprising a magnet 4 and a yoke 5 to enable the mirror 1, mirror holder 2, and coil 3 itself to be rotated by an electric current being applied to the coil 3. The irradiation light for the controlling beam (detection beam) from the light emitting element 61 is transmitted through the transmitting surface 1b of the mirror 1 and reflected by the reverse side of the reflective layer of the mirror 1. Thus, the irradiation light is received by the light receiving element 62. The reflective layer is obtained by bonding a substance for enhancing the reflecting power firmly to the surface of the base material of the mirror 1. However, since the thickness of such substance for enhancing the reflecting power is generally approximately 0.1 mm or less, the reflection surface 1a and the surface of the reverse side of the reflective layer are substantially coplanar. Thus, the center C of the rotation is substantially positioned on the reverse side surface. The outputs of the light receiving part 62a and light receiving part 62b of the light receiving element 62 are inputted into an angle detection circuit 7.

The beam on the light receiving element 62 is moved in accordance with the angles of the mirror 1 which vary by the rotation of the mirror 1. Therefore, the rotation angle signals of the mirror 1 are output by obtaining the differential between the outputs of the light receiving part 62a and light receiving part 62b of the two-piece photodiode in the angle detection circuit 7.

FIGS. 3A to 3C are views illustrating the operation of the present embodiment, in which the same reference numbers appearing in FIG. 2 represent the same constituents. FIG. 3A illustrates the case where the light receiving part 62a and light receiving part 62b of the two-piece photodiode of the light receiving element 62 are in contact at an interface in the direction perpendicular to the plane of the page. FIG. 3B illustrates the case where the light receiving part 62a and light receiving part 62b of the two-piece photodiode of the light receiving element 62 are in contact at an interface within the plane of the page. FIG. 3C illustrates the case represented in FIG. 3A, but shows a state where the mirror 1 has a translational motion in the direction A.

In the case of FIG. 3A where the rotation is within the plane of the page with the point C as its center, the luminous energies of the light receiving part 62a and light receiving part 62b vary by the rotation, thus making it possible to measure the rotation when the rotational vibration mode is being generated with the line B perpendicular to the reflection surface of the mirror 1 as its center, the reflected light from the mirror 1 is vibrated on the boundary of the light receiving part 62a and light receiving part 62b. As a result, there is no effect on the output. However, if the vibration mode is being generated, which may result in the translational motion in the directions A, there is a effect on the output because the vibration occurs in the direction which generates a differential between the light receiving part 62a and light receiving part 62b as shown in FIG. 3C. However, this effect can be made negligible if the distance between the light emitting element 61 and the light receiving element 62 is made sufficiently close.

In the case of FIG. 3B, the luminous energies of the light receiving part 62a and light receiving part 62b do not vary with rotation in the plane of the page with the point C as its center.

Figure 4:
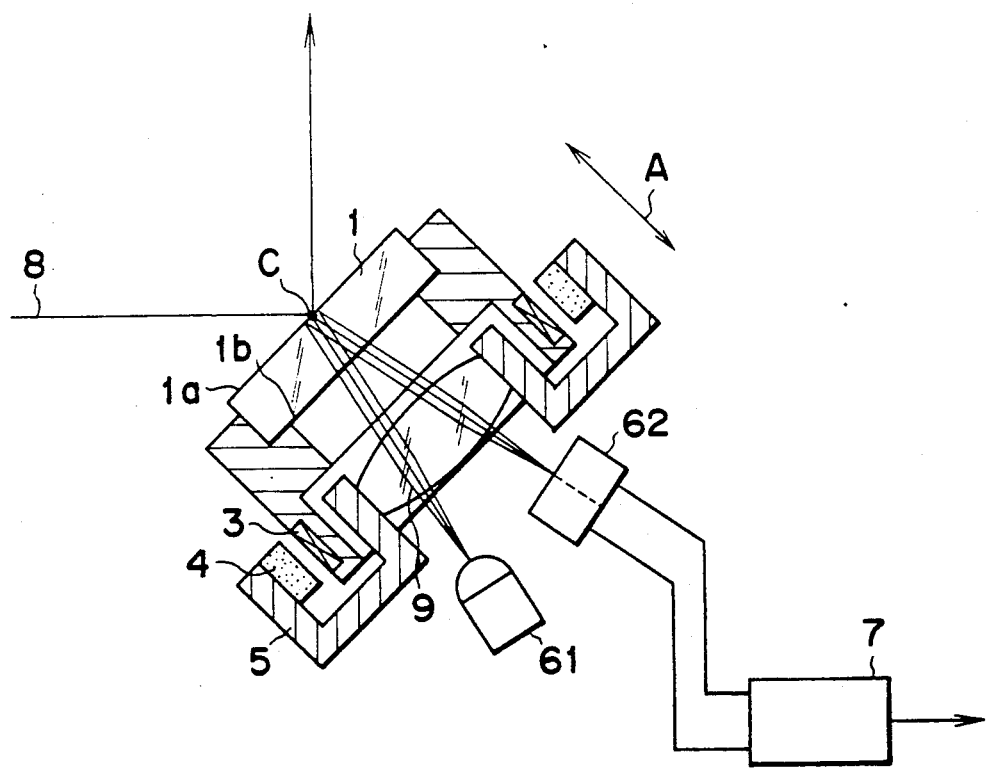
FIG. 4 is a cross-sectional view showing another embodiment of the mirror rotation angle detection mechanism according to the present invention.

FIG. 4 is a view showing another embodiment of the present invention, and the same reference designations appearing in FIG. 1 represent the same constituents. Here, a reference numeral 9 designates a condenser lens.

Through the condenser lens 9, the irradiation light from the light emitting element 61 becomes a parallel luminous flux which is transmitted through the other surface 1b and reflected at the point C on the reverse side of the reflective layer of the mirror 1. Then, the reflected parallel luminous flux is converged into the light receiving element through the condenser lens 9. The two outputs respectively from the two-piece light receiving part 62a and light receiving part 62b of the light receiving element 62 are inputted into the angle detection circuit 7. The beam on the light receiving element 62 is moved according to the rotation angles of the mirror in the plane of the drawing with the point C of the mirror 1 as a center, and the arrangement of the light receiving element is in such a form that the light receiving part 62a and light receiving part 62b of the two-piece photodiode of the light receiving element 62 are, as shown in FIG. 3A, in contact at the interface in the direction perpendicular to the plane of the drawing. Consequently, the rotation angle signal is output by obtaining a differential between the outputs of the two-piece photodiode in the rotation angle detection circuit 7.

At the time of the rotational vibration mode with the line B perpendicular to the reflection surface of the mirror 1 as its center, the reflected light from the mirror 1 is vibrated along the boundary line of the light receiving part 62a and light receiving part 62b. As a result, the output caused by the rotation in the plane of the drawing with the point C as its center is not influenced at all.

Nor does the vibration mode which may result in the translational motion in the direction A affect the output caused by the rotation within the plane of the drawing with the point C as its center, in particular because the light is maintained as parallel luminous flux between the condenser lens 9 and the mirror 1.

Figure 5:
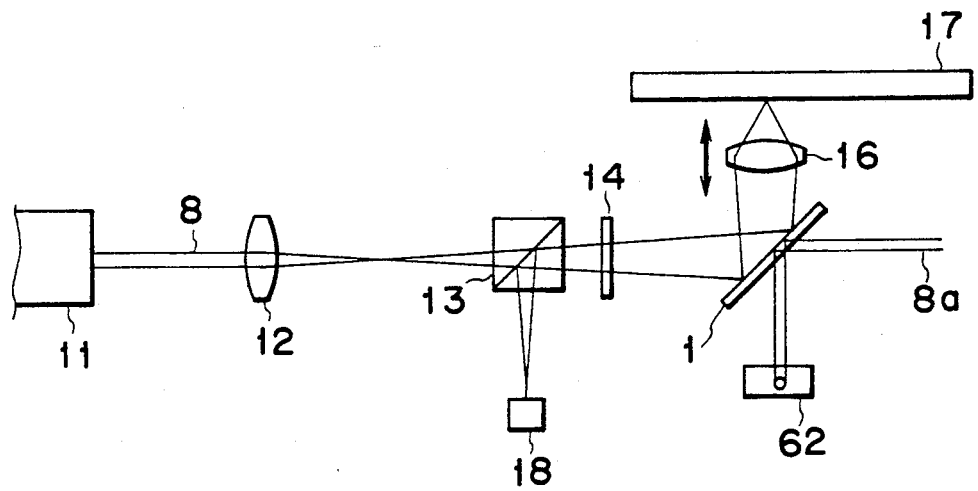
FIG. 5 is a schematic view showing the optical head of an optical information recording and reproducing apparatus in which a mirror rotation angle detection mechanism of the present invention is incorporated.

FIG. 5 is a view illustrating the operation of a mirror rotation actuator including the present invention and schematically shows the state where a mirror rotation angle detection mechanism according to the present invention is incorporated in an optical information recording and reproducing apparatus. Here, the same reference designations appearing in FIG. 2 represent the same constituents.

In FIG. 5, a reference numeral 11 designates a light source for laser, etc.; 8, a beam generated by the light source 11; 12, an intermediate lens to converge the beam 8; 13, a poralized beam splitter; 14, a phase plate; 1, a mirror in a mirror rotation actuator; 16, an objective lens to converge the reflected beam 8 from the mirror 1; and 17, an information disc. The reference numeral 18 designates a light receiving element which receives the reflected light from the information disc 17. Also, a reference numeral 8a designates the controlling beam from the mirror rotation actuator shown in the first-embodiment already described, and a reference number 62 designates the light receiving element which receives the reflected light from the mirror of the mirror rotation actuator for the controlling beam 8a shown in the first embodiment.

The beam generated by the light source 11 is converged by the intermediate lens 12 and reflected by mirror 1 of the mirror rotation actuator after being transmitted through the polarized beam splitter 13 and the phase plate 14, and is converged by the objective lens 16 to irradiate the information disc 17. The beam 8 reflected by the information disc 17 is returned on the same path, reflected by the polarized beam splitter 13, and converted into an electrical signal by the light receiving element 18. The mirror 1 of the mirror rotation actuator is controlled to rotate by the system structured as in the first embodiment or the second embodiment, so that the beam spot of the beam 8 can accurately follow the information track of the information disc 17. In other words, if the mirror 1 is controlled to enable the controlling beam 8a to be irradiated always evenly onto the two light receiving parts 62a and 62b of the light receiving element 62, the mirror 1 is maintained at a given position irrespective of existing wind pressure and mechanical vibration. Hence, the recording can reliably be reproduced accurately.

The objective lens 16 is vertically movable by known technique to correct the focusing of the beam spot on the information disc 17.

Figure 6:
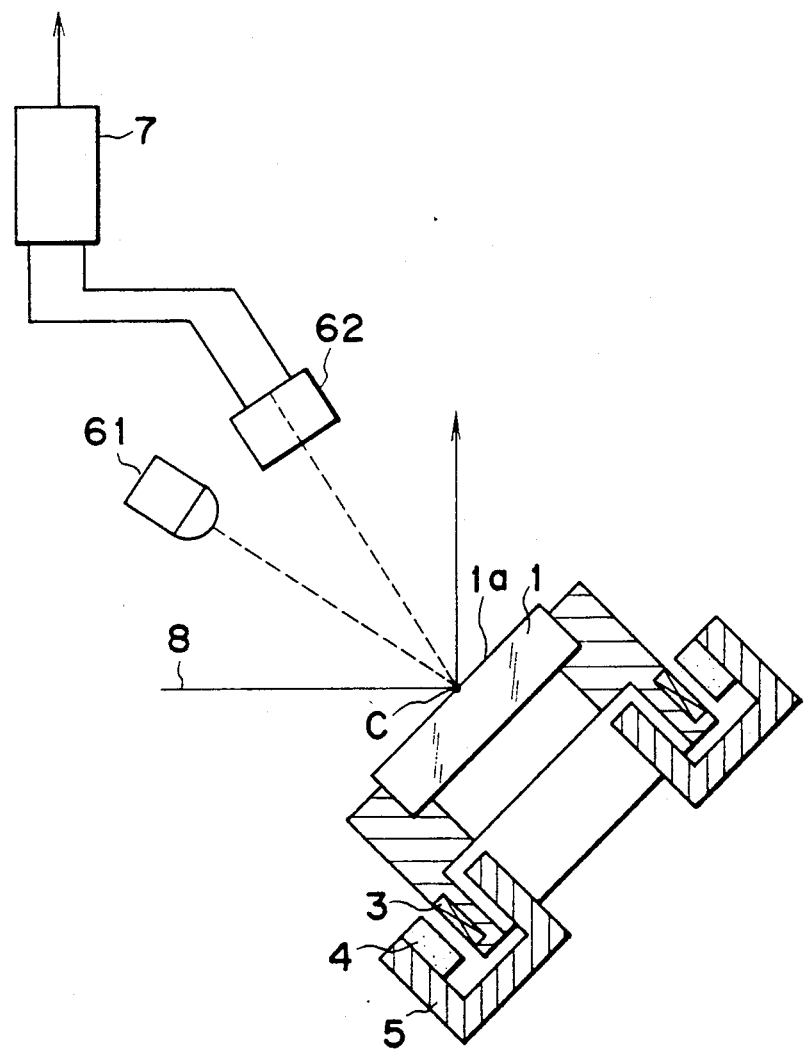
FIG. 6 is a cross-sectional view showing a mirror rotation angle detection mechanism which is structured to irradiate the light onto the reflection surface of the mirror from the front side thereof.

In the present embodiment, while the light emitting element 61 and the light receiving element 62 are arranged on the reverse side of the reflective layer of the mirror 1 as shown in FIG. 2 and FIG. 4, the arrangement is not limited thereto according to the present invention. FIG. 6 illustrates the case where the light emitting element 61 and the light receiving element 62 are arranged at the front side of the mirror 1 in the present embodiment. In FIG. 6, the same reference designations appearing in FIG. 1 represent the same constituents. In this case, the irradiation light from the light emitting element 61 for the controlling beam is reflected on the same surface as the light ray 8 from an optical head.

We claim:

1. An optical system having a mirror which is rotable about an axis substantially on a reflection surface thereof at which a main beam of light is reflected, and a mirror rotation angle detection mechanism, wherein said mirror has a thin reflective layer with opposite surfaces that are nearly coplanar, one of said surfaces constituting said reflection surface, and wherein said mirror rotation angle detection mechanism comprises light emitting means for irradiating a detection beam of light onto the other of said surfaces of said reflective layer, light receiving means for receiving the detection beam reflected by said other surface, and angle detection circuit means for detecting the rotation angle of said mirror from an output of said light receiving means.

2. A system according to claim 1, further comprising a condenser lens positioned between said light emitting means and said other surface of said reflective layer.

3. A system according to claim 1, wherein said light receiving means comprises a photodetector having a light receiving part divided to form two light receiving detectors.

4. A system according to claim 3, wherein said angle detection circuit means detects a difference between respective output signals of said two light receiving detectors.

* * * * *